United States Patent
Huang et al.

(10) Patent No.: US 9,325,406 B2
(45) Date of Patent: Apr. 26, 2016

(54) DATA RELAY MOBILE APPARATUS, DATA RELAY METHOD, AND COMPUTER PROGRAM PRODUCT THEREOF FOR A WIRELESS NETWORK

(75) Inventors: Chung-Ming Huang, Kaohsiung (TW); Lai Tu, Hubei (CN); Chih-Hsun Chou, Tucheng (TW)

(73) Assignee: Institute For Information Industry, Taipei (TW)

( * ) Notice: Subject to any disclaimer, the term of this patent is extended or adjusted under 35 U.S.C. 154(b) by 1324 days.

(21) Appl. No.: 12/630,813

(22) Filed: Dec. 3, 2009

(65) Prior Publication Data

US 2011/0122806 A1    May 26, 2011

(30) Foreign Application Priority Data

Nov. 26, 2009  (CN) .......................... 2009 1 0225812

(51) Int. Cl.
  *H04B 7/14* (2006.01)
  *H04B 7/155* (2006.01)
  *H04W 84/18* (2009.01)
  *H04W 88/04* (2009.01)

(52) U.S. Cl.
  CPC ........... *H04B 7/15514* (2013.01); *H04W 84/18* (2013.01); *H04W 88/04* (2013.01)

(58) Field of Classification Search
  CPC ........................ H04W 88/04; H04B 7/15514
  USPC ................................ 370/315, 316, 317, 318
  See application file for complete search history.

(56) References Cited

U.S. PATENT DOCUMENTS

| | | | | |
|---|---|---|---|---|
| 8,175,796 | B1* | 5/2012 | Blackburn et al. | 701/301 |
| 2006/0140123 | A1 | 6/2006 | Conner et al. | |
| 2006/0181431 | A1* | 8/2006 | Konishi et al. | 340/903 |
| 2007/0105554 | A1* | 5/2007 | Clark et al. | 455/435.1 |
| 2008/0316052 | A1* | 12/2008 | Ruffini | 340/901 |
| 2009/0221298 | A1* | 9/2009 | Hanner | 455/456.1 |
| 2010/0290347 | A1 | 11/2010 | Jiang et al. | |
| 2011/0194407 | A1* | 8/2011 | Ji et al. | 370/226 |

FOREIGN PATENT DOCUMENTS

| | | |
|---|---|---|
| CN | 1822522 A | 8/2006 |
| CN | 1989704 A | 6/2007 |
| CN | 101088261 A | 12/2007 |
| CN | 101389116 A | 3/2009 |
| CN | 101499934 A | 8/2009 |

OTHER PUBLICATIONS

Office Action by the Chinese patent office (SIPO) for the Chinese counterpart application to the present US application, Dec. 13, 2012, 9 pages.

* cited by examiner

*Primary Examiner* — Hassan Kizou
*Assistant Examiner* — Abdelnabi Musa
(74) *Attorney, Agent, or Firm* — Skaar Ulbrich Macari, P.A.

(57) ABSTRACT

A data relay mobile apparatus and a data relay method for a wireless network and a computer program product thereof are provided. The wireless network comprises a first mobile node and a second mobile node. The data relay mobile apparatus receives first status information and second status information from the first mobile node and the second mobile node, respectively. The data relay apparatus relays data according to the first status information and the second status information. With the aforesaid method, the present invention can effectively reduce the problems caused from shadow fading.

9 Claims, 6 Drawing Sheets

| Neighbor Table | | | |
|---|---|---|---|
| Timestamp | ID number | Mobile node movement data | Target node |
| $T_1$ | 2 | Position coordinates: 25.060061,121.485901<br>Speed: 30 km/hr<br>Acceleration: 10 m/s² (Direction: East) | N/A |
| $T_2$ | 3 | Position coordinates: 25.060112,121.485974<br>Speed: 40 km/hr<br>Acceleration: 5 m/s² (Direction: South) | N/A |

FIG. 2B

| Neighbor Table | | | |
|---|---|---|---|
| Timestamp | ID number | Mobile node movement data | Target node |
| $T_1$ | 2 | Position coordinates: 25.060061,121.485901<br>Speed: 30 km/hr<br>Acceleration: 10 m/s² (Direction: East) | N/A |
| $T_2$ | 3 | Position coordinates: 25.060112,121.485974<br>Speed: 40 km/hr<br>Acceleration: 5m/s² (Direction: South) | 2 |

FIG. 3B

DATA RELAY MOBILE APPARATUS, DATA RELAY METHOD, AND COMPUTER PROGRAM PRODUCT THEREOF FOR A WIRELESS NETWORK

PRIORITY

This application claims priority to Chinese Patent Application Serial No. 200910225812.5 filed on Nov. 26, 2009.

FIELD

The present invention relates to a data relay mobile apparatus, a data relay method, and a computer program product thereof for a wireless network. More particularly, the present invention relates to a data relay mobile apparatus, a data relay method, and a computer program product thereof for relaying data between a plurality of mobile nodes in a wireless network.

BACKGROUND

In terms of the communication distance, wireless network technologies currently available may be classified into a variety of wireless network standards such as WWAN (Wireless Wide Area Network), WMAN (Wireless Metropolitan Area Network), WLAN (Wireless Local Area Network), Bluetooth, Infrared (IR) and so on. Among these wireless network standards, WLAN standards are used the most commonly in people's daily life, for example, in WLAN access points (APs) that obviates the need of wiring, WLAN wireless network cards used in personal computers and the like.

Comparing to a wired network, a wireless network is more convenient to be deployed and has greater mobility in usage, and meanwhile, use of a wireless network can dramatically reduce the cost of manpower and materials that are conventionally needed for the wired network. However, albeit of these advantages, the wireless network still has many limitations such as unstable data transmission ranges, poor data transmission safety, low data transmission speeds and so on. Furthermore, the wireless network transmits data between individual nodes through wireless channels which are very susceptible to influence from environment factors such as the shadow fading effect caused by shelters. Therefore, interruptions of data transmission can be caused between the individual nodes.

To prevent environmental conditions (e.g., shelters) from influencing data transmission between individual nodes in a wireless network, the conventional technology employs relay stations (RSs) to deal with this problem. More specifically, according to the conventional technology, RSs are disposed in advance between blocks of the wireless network that are susceptible to influence from environment factors so that data transmission between network nodes that cannot be connected with each other via wireless channel directly may be accomplished in a relaying manner.

However, common RSs are all disposed fixedly, hence, disposition positions of the RSs can fulfill the data relay functions shall be considered first before a wireless network is initially deployed. Besides, the number of RSs to be disposed in advance is in proportion to the cost. Furthermore, once the RSs are disposed fixedly, it is difficult to change the disposition positions thereof, which causes significant degradation in disposition flexibility of the wireless network. Moreover, the fixedly disposed RSs are still very susceptible to influence from external factors; for example, an oversize movable vehicle parked nearby an RS would obstruct relaying of data transmitted from the RS. Therefore, apart from the drawbacks of high disposition cost and low disposition flexibility, the fixedly disposed RSs adopted in the prior art are not necessarily able to overcome the aforesaid shadow fading effect assuredly.

Accordingly, a continuing need exists in the art to overcome the drawbacks of high disposition cost and low disposition flexibility of the fixedly disposed RSs in the prior art, thereby to improve the likelihood of successful data transmissions.

SUMMARY

An objective of certain embodiments of the present invention is to provide a data relay method for a wireless network. The wireless network comprises a first mobile node and a second mobile node. The data relay method comprises the steps of: providing a node status list; receiving first status information of the first mobile node and second status information of the second mobile node; updating the node status list with the first status information and the second status information; determining that a correspondence status exists between the first mobile node and the second mobile node according to the first status information and the second status information; determining whether the second mobile node is a target node of the first mobile node according to the first status information; and relaying the second status information to the first mobile node according to the correspondence status and the determination result of the previous step.

Another objective of certain embodiments of the present invention is to provide a computer program product, which comprises a tangible machine-readable medium having executable codes to cause an apparatus to perform the data relay method for a wireless network. When the executable codes are loaded into a data relay mobile apparatus, the aforesaid data relay method for a wireless network can be accomplished.

Yet a further objective of certain embodiments of the present invention is to provide a data relay mobile apparatus for a wireless network. The wireless network comprises a first mobile node and a second mobile node. The data relay mobile apparatus comprises a storage module, a receiving module, a processing module and a transmitting module. The storage module is configured to store a node status list. The receiving module is configured to receive first status information of the first mobile node and second status information of the second mobile node. The processing module is configured to update the node status list with the first status information and the second status information, to determine that a correspondence status exists between the first mobile node and the second mobile node according to the first status information and the second status information, and to determine whether the second mobile node is a target node of the first mobile node according to the first status information. The transmitting module is configured to relay the second status information to the first mobile node according to the correspondence status and the determination result of the processing module.

Accordingly, the data relay mobile apparatus, the data relay method, and the computer program product thereof according to certain embodiments of the present invention are capable of relaying data without modifying the structures of the mobile nodes that are conventionally used in a wireless network. Hence, apart from eliminating the need of disposing additional RSs in the wireless network, certain embodiments of the present invention may also achieve high flexibility of data relay by use of mobile nodes. As a result, disposition cost of the wireless network gets lowered effectively and the problem caused by the shadow fading effect is effectively solved.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIGS. 2A and 2B are schematic diagrams illustrating an example of the first embodiment of the present invention;

FIGS. 3A and 3B are schematic diagrams illustrating another example of the first embodiment of the present invention.

Figure 1:
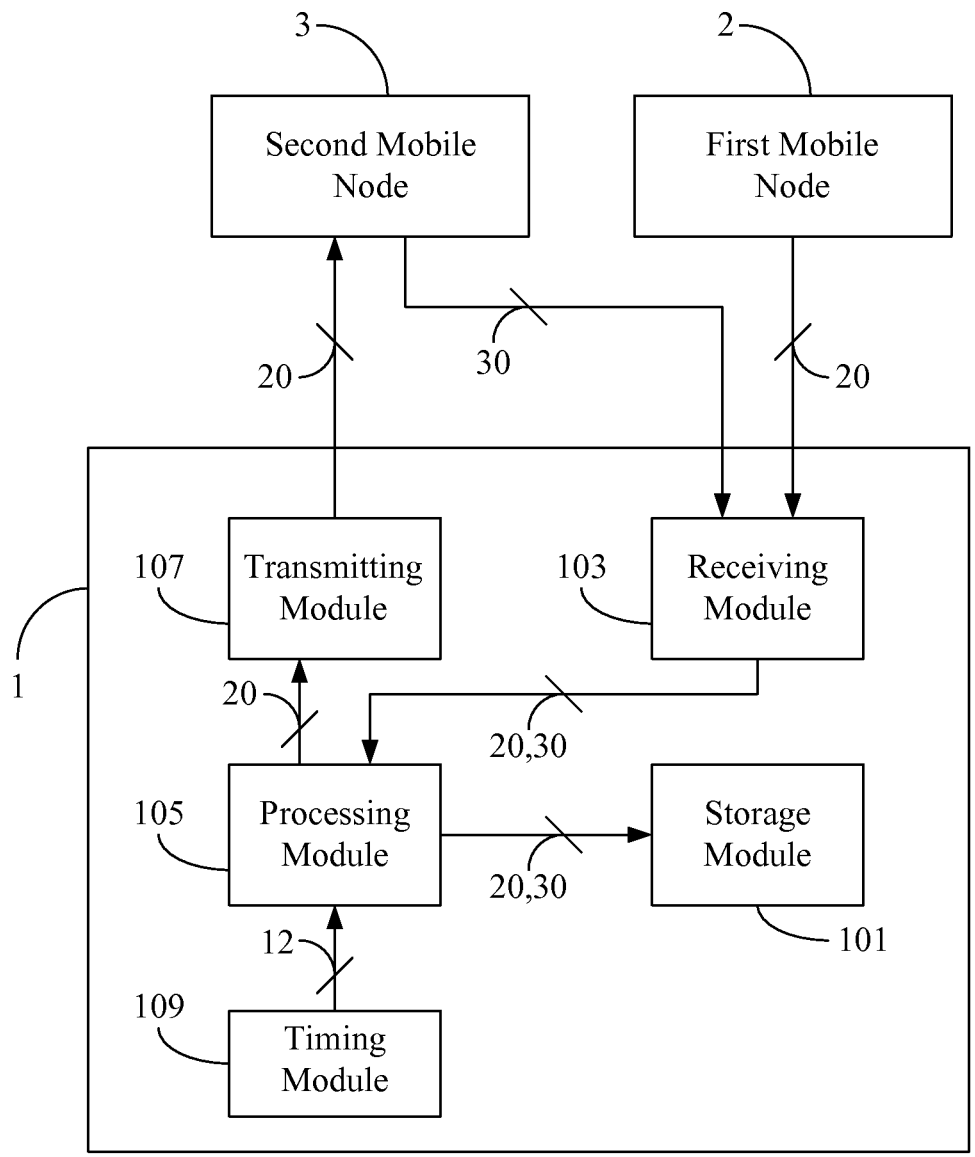
FIG. 1 is a schematic diagram illustrating a data relay mobile apparatus of a first embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to example embodiments thereof. The present invention relates to a data relay mobile apparatus and a data relay method. The data relay mobile apparatus may be a smart mobile phone, a personal digital assistant (PDA), a netbook or the like with wireless communication functionality. However, descriptions of these embodiments are only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

FIG. 1 shows a first embodiment of the present invention, which is a data relay mobile apparatus 1 for a wireless network. The wireless network comprises a plurality of mobile nodes. For purpose of simplicity, only a first mobile node 2 and a second mobile node 3 are illustrated for description in this embodiment. The data relay mobile apparatus 1 comprises a storage module 101, a receiving module 103, a processing module 105, a transmitting module 107 and a timing module 109. It shall be noted that, in this embodiment, both the first mobile node 2 and the second mobile node 3 are located within a wireless communication coverage 11 of the data relay mobile apparatus 1, and wireless channels have been established between the data relay mobile apparatus 1 and the first and the second mobile nodes 2, 3 respectively so that data transmission can be accomplished between the data relay mobile apparatus 1 and the first and the second mobile nodes 2, 3 respectively. The first mobile node 2 and the second mobile node 3 respectively broadcast status information thereof on a periodic basis.

More specifically, the storage module 101 has a node status list designated as Neighbor Table, which is configured to store status information of the data relay mobile apparatus 1 itself and adjacent mobile nodes (e.g., the first mobile node 2 and the second mobile node 3). The timing module 109 is configured to set a time period 12. After the receiving module 103 receives first status information 20 broadcasted by the first mobile node 2 periodically and second status information 30 broadcasted by the second mobile node 3 periodically, the processing module 105 updates the node status list Neighbor Table with the first status information 20 and the second status information 30. Meanwhile, the processing module 105 determines whether a correspondence status exists between the first mobile node 2 and the second mobile node 3 according to the first status information 20 and the second status information 30, and determines whether the second mobile node 3 is a target node of the first mobile node 2 according to the first status information 20.

If the processing module 105 determines that a correspondence status does exist between the first mobile node 2 and the second mobile node 3 and that the second mobile node 3 is not a target node of the first mobile node 2, it means that the second status information 30 broadcasted by the second mobile node 3 has not been received by the first mobile node 2. In this case, the processing module 105 will determine, within the time period 12 set by the timing module 109, whether the second status information 30 broadcasted by the second mobile node 3 has been received by the first mobile node 2. If the processing module 105 determines that the second status information 30 re-broadcasted by the second mobile node 3 has still not been received by the first mobile node 2 within the time period 12, the transmitting module 107 will relay the second status information 30 to the first mobile node 2.

Figure 2A:
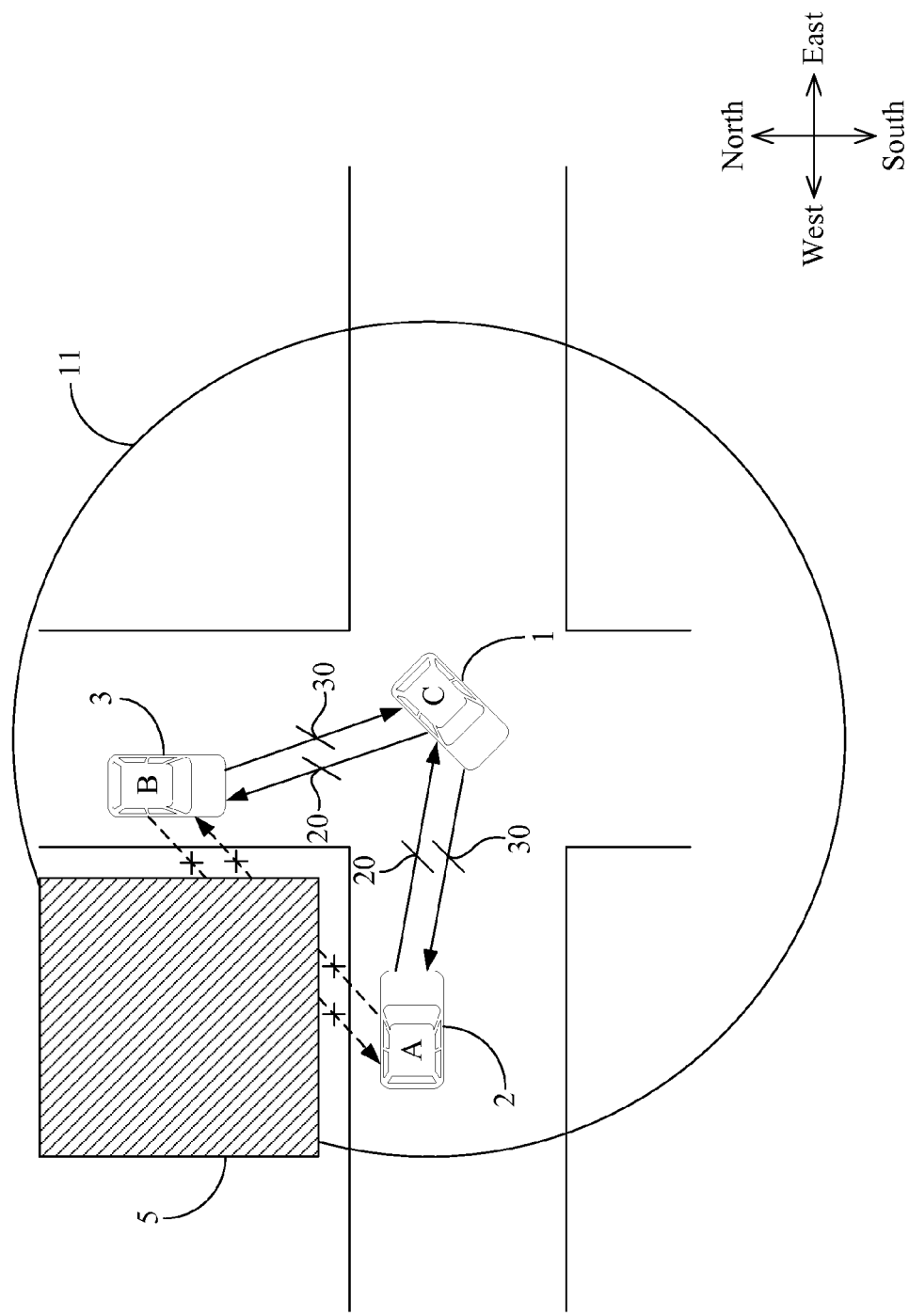

Hereinafter, the first example embodiment of the present invention will be further described with reference to an example depicted in FIGS. 2A and 2B. FIG. 2A is a schematic diagram in which vehicles are employed as the data relay mobile apparatus 1 and the mobile nodes 2, 3 of the wireless network, and FIG. 2B is a schematic diagram illustrating content of the node status list Neighbor Table. It shall be appreciated that, a vehicle A represents the first mobile node 2, a vehicle B represents the second mobile node 3, and a vehicle C represents the data relay mobile apparatus 1.

As shown in FIG. 2A, if the first mobile node 2 (vehicle A) and the second mobile node 3 (vehicle B) keep forwarding along the current directions, collision with each other is likely to occur. Hence, if both the first mobile node 2 (vehicle A) and the second mobile node 3 (vehicle B) can broadcast status information thereof (e.g., the first status information 20 and the second status information 30) in advance via the wireless network, the first mobile node 2 (vehicle A) will be able to determine, from the second status information 30 of the second mobile node 3 (vehicle B) which the mobile node 2 (vehicle A) receives, that a collision with the second mobile node 3 (vehicle B) is likely to occur and consequently take an dodge action; likewise, the second mobile node 3 (vehicle B) will be able to determine, from the first status information 20 of the first mobile node 2 (vehicle A) it receives, that a collision with the first mobile node 2 (vehicle A) is likely to occur and consequently take evasive action.

In fact, it is not always possible that the first mobile node 2 (vehicle A) and the second mobile node 3 (vehicle B) can receive the status information from each other via the wireless network. For example, a shelter 5 shown in FIG. 2A could make it impossible for the first mobile node 2 (vehicle A) and the second mobile node 3 (vehicle B) to correctly receive the first status information 20 and the second status information 30 from each other respectively via the wireless network, thereby making it impossible to prevent the first mobile node 2 (vehicle A) and the second mobile node 3 (vehicle B) from the risk of collision. In this case, if both the first mobile node 2 (vehicle A) and the second mobile node 3 (vehicle B) are located within the wireless communication coverage 11 of the data relay mobile apparatus 1 (vehicle C), the data relay mobile apparatus 1 (vehicle C) will be able to receive both the first status information 20 and the second status information 30 broadcasted by the first mobile node 2 (vehicle A) and the second mobile node 3 (vehicle B), respectively, and determine whether it needs to relay the data according to the first status information 20 and the second status information 30.

In more detail, the first mobile node 2 (vehicle A) and the second mobile node 3 (vehicle B) respectively broadcast the first status information 20 and the second status information 30 periodically. After the first status information 20 and the second status information 30 are received by the receiving module 103 of the data relay mobile apparatus 1 (vehicle C), the processing module 105 will update the node status list Neighbor Table with the first status information 20 and the second status information 30.

It shall be noted that, each of the first status information 20 and the second status information 30 comprises a time stamp field, an identification (ID) number field, a mobile node movement data field and a target node field. In more detail, the time stamp field records the time when the respective status information is broadcasted; the ID number field records a code number of the mobile node that transmits the status information; the mobile node movement data field records position coordinates, a speed and an acceleration of the respective mobile node; and the target node field records any other mobile nodes that are known to potentially collide with the mobile node.

After being updated with the first status information 20 and the second status information 30 by the processing module 105 of the data relay mobile apparatus 1 (vehicle C), the node status list Neighbor Table stored in the storage module 101 will be as shown in FIG. 2B. More specifically, after being sequentially received by the receiving module 103 of the data relay mobile apparatus 1 (vehicle C), the first status information 20 of the first mobile node 2 (vehicle A) and the second status information 30 of the second mobile node 2 (vehicle B) are recorded by the processing module 50 sequentially into the node status list Neighbor Table. For the example depicted in FIG. 2A, at a time point $T_1$, the first mobile node 2 (vehicle A) broadcasts the first status information 20 containing an ID number of 2. Besides the ID number of 2, the first status information 20 also contains the first mobile node movement data of the first mobile node 2 (vehicle A) at the time point $T_1$, i.e., position coordinates of (25.060061, 121.485901), a speed of 30 km/hr, and an acceleration of 10 m/s² directed to the east direction. Meanwhile, due to influence of the shelter 5, it is impossible for the first mobile node 2 (vehicle A) to correctly receive the status information broadcasted by the second mobile node 3 (vehicle B), so it is impossible for the first mobile node 2 (vehicle A) to determine whether it will collide with the second mobile node 3 (vehicle B). Hence, the target node field of the first status information 20 records no information of any other mobile nodes.

Thereafter, the processing module 105 of the data relay mobile apparatus 1 (vehicle C) records the first status information 20 broadcasted by the first mobile node 2 (vehicle A) into the first row of the node status list Neighbor Table.

Afterwards, at a time point $T_2$, the second mobile node 3 (vehicle B) broadcasts the second status information 30 containing an ID number of 3. Besides the ID number of 3, the second status information 30 also contains the second mobile node movement data of the second mobile node 3 (vehicle B) at the time point $T_2$, i.e., position coordinates of (25.060112, 121.485974), a speed of 40 km/hr, and an acceleration of 5 m/s² directed to the south direction. Meanwhile, due to influence of the shelter 5, it is impossible for the second mobile node 3 (vehicle B) to correctly receive the status information broadcasted by the first mobile node 2 (vehicle A), so it is impossible for the second mobile node 3 (vehicle B) to determine whether it will collide with the first mobile node 2 (vehicle A). Hence, the target node field of the second status information 30 records no information of any other mobile nodes.

Thereafter, the processing module 105 of the data relay mobile apparatus 1 (vehicle C) records the second status information 30 broadcasted by the second mobile node 3 (vehicle B) into the second row of the node status list Neighbor Table.

Apart from updating the node status list Neighbor Table with the first status information 20 and the second status information 30, the processing module 105 of the data relay mobile apparatus 1 (vehicle C) also determines, according to the first mobile node movement data (i.e., the position coordinates, speed and acceleration) of the first status information 20 and the second mobile node movement data (i.e., the position coordinates, speed and acceleration) of the second status information 30, whether the first mobile node 2 (vehicle A) and the second mobile node 3 (vehicle B) will collide with each other if they don't change the forwarding paths. At the same time, as neither of the target node fields of the first status information 20 and the second status information 30 records information of any other mobile nodes, the data relay mobile apparatus 1 (vehicle C) must relay the second status information 30 of the second mobile node 3 (vehicle B) to the first mobile node 2 (vehicle A) and/or relay the first status information 20 of the first mobile node 2 (vehicle A) to the second mobile node 3 (vehicle B) so that the first mobile node 2 (vehicle A) and the second mobile node 3 (vehicle B) can receive information from each other.

In more detail, if the processing module 105 of the data relay mobile apparatus 1 (vehicle C) determines that data relay is needed, the timing module 109 will set a time period 12. If, within the time period 12, the receiving module 103 of the data relay mobile apparatus 1 (vehicle C) fails to receive status information re-broadcasted by the first mobile node 2 (vehicle A), or the status information re-broadcasted by the first mobile node 2 (vehicle A) that is received by the receiving module 103 of the data relay mobile apparatus 1 (vehicle C) within the time period 12 still contains no information of any other mobile nodes in the target node field, it means that the first mobile node 2 (vehicle A) still has not received the status information broadcasted by the second mobile node 3 (vehicle B). This would cause the first mobile node 2 (vehicle A) to falsely determine that there is no other mobile node that might collide with it.

When such a case occurs, the transmitting module 107 of the data relay mobile apparatus 1 (vehicle C) will transmit the second status information 30 to the first mobile node 2 (vehicle A) at the end of the time period 12. Thus, the first mobile node 2 (vehicle A) will be able to obtain the second status information 30 of the second mobile node 3 (vehicle B) and, consequently, determine that collision with the second mobile node 3 (vehicle B) is likely to occur, thereby taking a dodge action.

On the other hand, if, within the time period 12, the receiving module 103 of the data relay mobile apparatus 1 (vehicle C) fails to receive status information re-broadcasted by the second mobile node 3 (vehicle B), or the status information re-broadcasted by the second mobile node 3 (vehicle B) that is received by the receiving module 103 of the data relay mobile apparatus 1 (vehicle C) within the time period 12 still contains no information of any other mobile nodes in the target node field, it means that the second mobile node 3 (vehicle B) still has not received the status information broadcasted by the first mobile node 2 (vehicle A). This would cause the second mobile node 3 (vehicle B) to falsely determine that there is no other mobile node that might collide with it.

Similarly, when such a case occurs, the transmitting module 107 of the data relay mobile apparatus 1 (vehicle C) will transmit the first status information 20 to the second mobile node 3 (vehicle B) at the end of the time period 12. Thus, the second mobile node 3 (vehicle B) will be able to obtain the first status information 20 of the first mobile node 2 (vehicle A) and, consequently, determine that collision with the first mobile node 2 (vehicle A) is likely to occur, thereby taking a dodge or evasive action.

It shall be emphasized that, the time period 12 is set in consideration of a bandwidth of the wireless network. More specifically, if the data relay mobile apparatus 1 relays directly all status information it receives, this would cause a significant increase in computational burden of the data relay mobile apparatus 1 and occupation of a large amount of bandwidth resources of the wireless network. However, because the mobile nodes (the first mobile node 2 and the second mobile node 3) and the data relay mobile apparatus 1 in the wireless network are all movable nodes, status information that the mobile nodes have failed to receive from each other due to the shadow fading effect may be able to be received later within the time period 12 owing to changes in position of the mobile nodes. Accordingly, the data relay mobile apparatus 1 will not need to relay the data, which may reduce the computational burden of the data relay mobile apparatus 1 and maintain a bandwidth utilization efficiency of the wireless network.

Figure 3A:
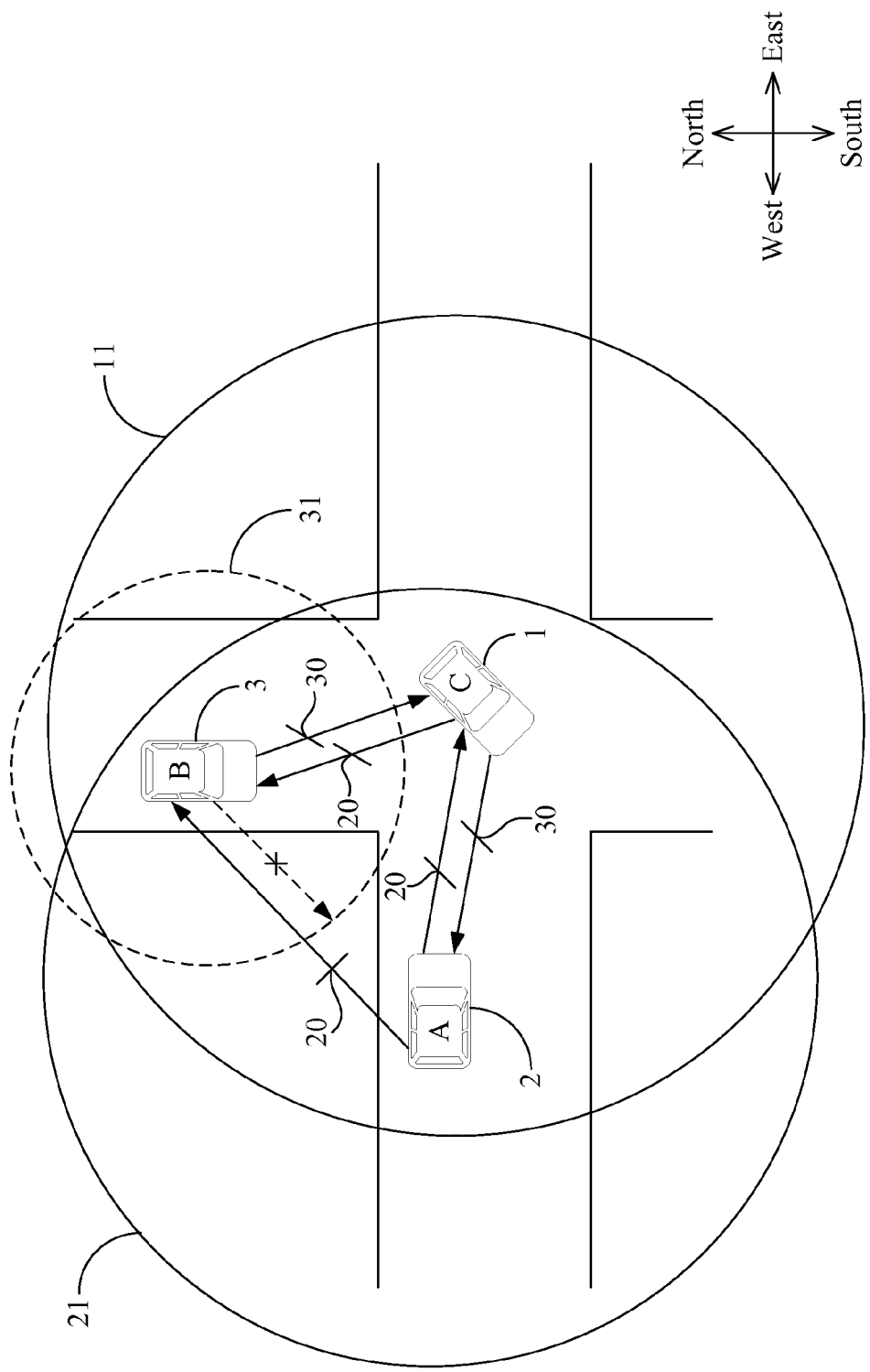

Hereinafter, the first example embodiment of the present invention will be further described with reference to another example depicted in FIGS. 3A and 3B. FIG. 3A is a schematic diagram in which vehicles are employed as the data relay mobile apparatus 1 and the mobile nodes 2, 3 of the wireless network, and FIG. 3B is a schematic diagram illustrating content of the node status list Neighbor Table. It shall be appreciated that, a vehicle A represents the first mobile node 2, a vehicle B represents the second mobile node 3, and a vehicle C represents the data relay mobile apparatus 1. It shall also be particularly noted that, in FIGS. 3A and 3B, except for slight changes made to content of the node status list Neighbor Table shown in FIG. 3B, most of the descriptions are identical to those of the example shown in FIGS. 2A and 2B and, thus, will not be further described herein.

As shown in FIG. 3A, if the first mobile node 2 (vehicle A) and the second mobile node 3 (vehicle B) keep forwarding along the current directions, collision with each other is likely to occur. Hence, if both the first mobile node 2 (vehicle A) and the second mobile node 3 (vehicle B) can broadcast status information thereof (e.g., the first status information 20 and the second status information 30) in advance via the wireless network, the first mobile node 2 (vehicle A) will be able to determine, from the second status information 30 of the second mobile node 3 (vehicle B) which the first mobile node 2 (vehicle A) receives, that a collision with the second mobile node 3 (vehicle B) is likely to occur and consequently take an dodge action; likewise, the second mobile node 3 (vehicle B) will be able to determine, from the first status information 20 of the first mobile node 2 (vehicle A) which the second mobile node 3 (vehicle B) receives, that a collision with the first mobile node 2 (vehicle A) is likely to occur and consequently take an dodge action.

In fact, it is not always possible that the first mobile node 2 (vehicle A) and the second mobile node 3 (vehicle B) can receive the status information from each other via the wireless network. As shown in FIG. 3A, the second mobile node 3 (vehicle B) is located within a wireless communication coverage 21 of the first mobile node 2 (vehicle A), so the first status information 20 of the first mobile node 2 (vehicle A) can be received by the second mobile node 3 (vehicle B); however, the first mobile node 2 (vehicle A) is not located within a wireless communication coverage 31 of the second mobile node 3 (vehicle B), so the first mobile node 2 (vehicle A) fails to receive the second status information 30 of the second mobile node 3 (vehicle B).

As a consequence, since the first mobile node 2 (vehicle A) fails to receive the second status information 30 of the second mobile node 3 (vehicle B) via the wireless network, it is still impossible to prevent the first mobile node 2 (vehicle A) and second mobile node 3 (vehicle B) from the risk of collision. In this case, if both the first mobile node 2 (vehicle A) and the second mobile node 3 (vehicle B) are located within the wireless communication coverage 11 of the data relay mobile apparatus 1 (vehicle C), the data relay mobile apparatus 1 (vehicle C) will be able to receive both the first status information 20 and the second status information 30 broadcasted by the first mobile node 2 (vehicle A) and the second mobile node 3 (vehicle B), and also determine whether it needs to relay the data according to the first status information 20 and the second status information 30.

After being updated with the first status information 20 and the second status information 30 by the processing module 105 of the data relay mobile apparatus 1 (vehicle C), the node status list Neighbor Table stored in the storage module 101 will be as shown in FIG. 3B. More specifically, after being sequentially received by the receiving module 103 of the data relay mobile apparatus 1 (vehicle C), the first status information 20 of the first mobile node 2 (vehicle A) and the second status information 30 of the second mobile node 2 (vehicle B) are recorded by the processing module 50 sequentially into the node status list Neighbor Table. For the example depicted in FIG. 3A, at a time point $T_1$, the first mobile node 2 (vehicle A) broadcasts the first status information 20 containing an ID number of 2. Besides the ID number of 2, the first status information 20 also contains the first mobile node movement data of the first mobile node 2 (vehicle A) at the time point $T_1$, i.e., position coordinates of (25.060061, 121.485901), a speed of 30 km/hr, and an acceleration of 10 m/s$^2$ directed to the east direction. Meanwhile, because the first mobile node 2 (vehicle A) is not located within the wireless communication coverage 31 of the second mobile node 3 (vehicle B), the first mobile node 2 (vehicle A) fails to correctly receive the status information broadcasted by the second mobile node 3 (vehicle B), so it is impossible for the first mobile node 2 (vehicle A) to determine whether it will collide with the second mobile node 3 (vehicle B). Hence, the target node field of the first status information 20 records no information of any other mobile nodes.

Thereafter, the processing module 105 of the data relay mobile apparatus 1 (vehicle C) records the first status information 20 broadcasted by the first mobile node 2 (vehicle A) into the first row of the node status list Neighbor Table.

Afterwards, at a time point $T_2$, the second mobile node 3 (vehicle B) broadcasts the second status information 30 containing an ID number of 3. Besides the ID number of 3, the second status information 30 also contains the second mobile node movement data of the second mobile node 3 (vehicle B) at the time point $T_2$, i.e., position coordinates of (25.060112, 121.485974), a speed of 40 km/hr, and an acceleration of 5 $m/s^2$ directed to the south direction. Meanwhile, since the second mobile node 3 (vehicle B) is located within the wireless communication coverage 21 of the first mobile node 2 (vehicle A), the second mobile node 3 (vehicle B) will correctly receive the status information 20 broadcasted by the first mobile node 2 (vehicle A). Therefore, the second mobile node 3 (vehicle B) will determine and ascertain that it will collide with the first mobile node 2 (vehicle A). Accordingly, the target node field of the second status information 30 records the ID number (i.e., 2) of the first mobile node 2.

Thereafter, the processing module 105 of the data relay mobile apparatus 1 (vehicle C) records the second status information 30 broadcasted by the second mobile node 3 (vehicle B) into the second row of the node status list Neighbor Table.

Apart from updating the node status list Neighbor Table with the first status information 20 and the second status information 30, the processing module 105 of the data relay mobile apparatus 1 (vehicle C) also determines, according to the first mobile node movement data (i.e., the position coordinates, speed and acceleration) of the first status information 20 and the second mobile node movement data (i.e., the position coordinates, speed and acceleration) of the second status information 30 or according to the ID number of the first status information 20 recorded in the target node field of the second status information 30, whether the first mobile node 2 (vehicle A) and the second mobile node 3 (vehicle B) will collide with each other if they don't change forwarding paths. Meanwhile, as the target node field of the first status information 20 records no information of any other mobile nodes, the data relay mobile apparatus 1 (vehicle C) must relay the second status information 30 of the second mobile node 3 (vehicle B) to the first mobile node 2 (vehicle A) so that the first mobile node 2 (vehicle A) can receive information from the second mobile node 3 (vehicle B).

In more detail, if the processing module 105 of the data relay mobile apparatus 1 (vehicle C) determines that data relay is needed, the timing module 109 will also set a time period 12. If, within the time period 12, the receiving module 103 of the data relay mobile apparatus 1 (vehicle C) fails to receive status information re-broadcasted by the first mobile node 2 (vehicle A), or the status information re-broadcasted by the first mobile node 2 (vehicle A) that is received by the receiving module 103 of the data relay mobile apparatus 1 (vehicle C) within the time period 12 still contains no information of any other mobile nodes in the target node field, it means that the first mobile node 2 (vehicle A) still has not received the status information broadcasted by the second mobile node 3 (vehicle B). This would cause the first mobile node 2 (vehicle A) to falsely determine that there is no other mobile node that might collide with it.

When such a case occurs, the transmitting module 107 of the data relay mobile apparatus 1 (vehicle C) will transmit the second status information 30 to the first mobile node 2 (vehicle A) at the end of the time period 12. Thus, the first mobile node 2 (vehicle A) will be able to obtain the second status information 30 of the second mobile node 3 (vehicle B) and, consequently, determine that collision with the second mobile node 3 (vehicle B) is likely to occur, thereby taking a dodge or evasive action.

On the other hand, as the target node field of the second status information 30 has recorded the ID number of the first mobile node 2, the processing module 105 of the data relay mobile apparatus 1 (vehicle C) will determine that the data relay mobile apparatus 1 (vehicle C) doesn't need to relay the first status information 20 of the first mobile node 2 (vehicle A) to the second mobile node 3 (vehicle B). In other words, as the second mobile node 3 (vehicle B) itself has already received the first status information 20 broadcasted by the first mobile node 2 (vehicle A) and ascertained that collision with the first mobile node 2 (vehicle A) is likely to occur, it is unnecessary to further receive the first status information 20 of the first mobile node 2 (vehicle A) via the data relay mobile apparatus 1 (vehicle C).

The first example embodiment has described how to relay status information of the first mobile node 2 and the second mobile node 3 in the wireless network with reference to a single data relay mobile apparatus. It shall be particularly noted that, the present invention is not merely limited to relaying data with a single data relay mobile apparatus, and status information of the first mobile node 2 and/or the second mobile node 3 in the wireless network may also be relayed by one of a plurality of data relay mobile apparatuses.

If there is a plurality of data relay mobile apparatuses that can accomplish relaying of status information of the first mobile node 2 and/or the second mobile node 3, data relay probabilities will be further calculated among the data relay mobile apparatuses to choose one of the data relay mobile apparatuses to relay data. In more detail, each of the data relay mobile apparatuses will calculate probabilities of relaying status information of the first mobile node 2 and/or the second mobile node 3 according to the respective wireless communication coverage, a distance from the first mobile node 2, a distance from the second mobile node 3 and signal strength of wireless signals transmitted. Then according to the probabilities, one of the data relay mobile apparatuses is chosen to relay status information of the first mobile node 2 and/or the second mobile node 3. Calculation of the data relay probabilities of the data relay mobile apparatuses may be accomplished by those of ordinary skill in the art through various existing algorithms and, thus, will not be further described herein.

Figure 4:
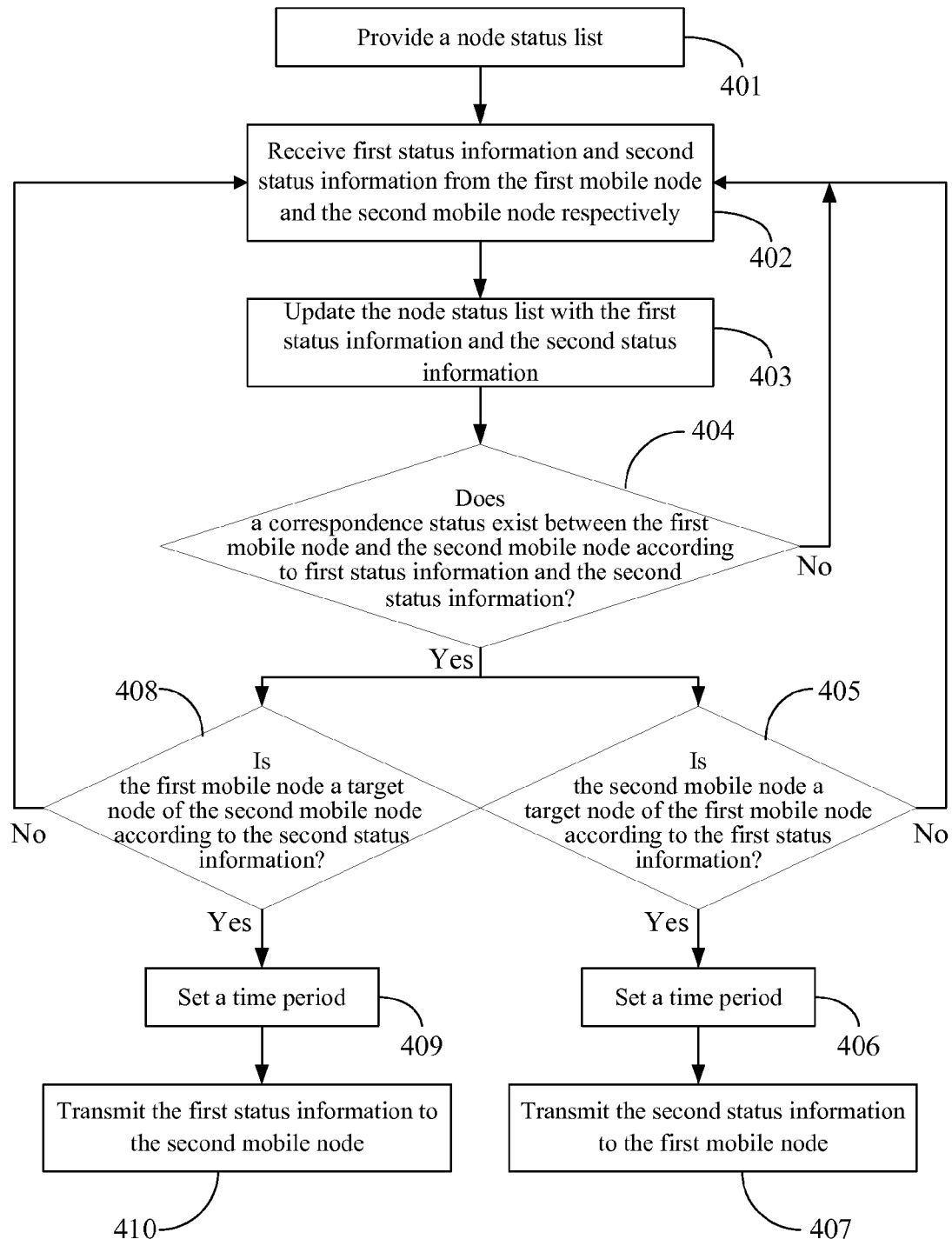
FIG. 4 is a flowchart of a second embodiment of the present invention.

FIG. 4 shows a second example embodiment of the present invention, which is a data relay method for a wireless network. The wireless network comprises a first mobile node and a second mobile node, e.g., the first mobile node 2 and the second mobile node 3 described in this embodiment. The data relay method of the present invention may be used for a data relay mobile apparatus, e.g., the data relay mobile apparatus 1 described in this embodiment. The data relay mobile apparatus 1 comprises a storage module 101, a receiving module 103, a processing module 105, a transmitting module 107 and a timing module 109.

In particular, the data relay method of the present invention may be executed by a computer program product which comprises a tangible machine-readable medium having executable codes. When the executable codes are loaded into the data relay mobile apparatus 1 via a computer and are executed, the data relay method of the present invention may be accomplished. The tangible machine-readable medium may be a read only memory (ROM), a flash memory, a floppy disk, a hard disk, a compact disk, a mobile disk, a magnetic tape, a database accessible to networks, or any other storage media with the same function and well known to those skilled in the art.

Firstly, step 401 is executed to enable the storage module to provide a node status list. Then, step 402 is executed to enable the receiving module to receive first status information and second status information from the first mobile node and the second mobile node respectively. Next, step 403 is executed to enable the processing module to update the node status list with the first status information and the second status information. Subsequently, the processing module will determine whether to relay data according to the first status information and the second status information.

Subsequent to step 403, step 404 is executed to enable the processing module to determine whether a correspondence status exists between the first mobile node and the second mobile node (i.e., whether there is a risk that the two mobile nodes will collide with each other) according to first status information and the second status information. In more detail, the first status information and the second status information comprise first mobile node movement data and second mobile node movement data respectively; and the processing module determines whether there is a risk that the first mobile node and the second mobile node will collide with each other (i.e., whether there is a correspondence status therebetween) according to the first mobile node movement data and the second mobile node movement data.

If it is determined by the processing module in step 404 that a correspondence status does exist between the first mobile node and the second mobile node, then step 405 and step 408 are executed simultaneously. Step 405 is to enable the processing module to determine whether the second mobile node is a target node of the first mobile node according to the first status information. More specifically, the first status information comprises a target node field, and when the target node field of the first status information records no information of the second mobile node (i.e., does not records an ID number of the second mobile node), the processing module can determine that the second mobile node is not a target node of the first mobile node. In other words, although a correspondence status exists between the first mobile node and the first mobile node because the first mobile node fails to receive the status information of the first mobile node, the first status information does not record the ID number of the second mobile node.

If it is determined by the processing module in step 405 that the second mobile node is not a target node of the first mobile node, then step 406 is executed to enable the timing module to set a time period so as to reduce the computational burden of the data relay mobile apparatus and maintain a bandwidth utilization efficiency of the wireless network. Thereafter, step 407 is executed to enable the transmitting module to transmit the second status information to the first mobile node so that the first mobile node can receive the status information of the second mobile node through data relaying.

Step 408 is to enable the processing module to determine whether the first mobile node is a target node of the second mobile node according to the second status information. More specifically, the second status information also comprises a target node field, and when the target node field of the second status information records no information of the first mobile node (i.e., does not records an ID number of the first mobile node), the processing module can determine that the first mobile node is not a target node of the second mobile node. In other words, although a correspondence status exists between the first mobile node and the first mobile node because the first mobile node fails to receive the status information of the first mobile node, the first status information does not record the ID number of the second mobile node.

If it is determined by the processing module in step 408 that the first mobile node is not a target node of the second mobile node, then step 409 is executed to enable the timing module to set a time period so as to reduce the computational burden of the data relay mobile apparatus and maintain a bandwidth utilization efficiency of the wireless network. Thereafter, step 410 is executed to enable the transmitting module to transmit the first status information to the second mobile node so that the second mobile node can receive the status information of the first mobile node through data relaying.

On the other hand, if it is determined by the processing module in step 405 and step 408 that the second mobile node is a target node of the first mobile node and the first mobile node is a target node of the second mobile node, then step 402 is executed to enable the receiving module to continuously receive the first status information and the second status information from the first mobile node and the second mobile node respectively.

If it is determined by the processing module in step 404 that there exists no correspondence status between the first mobile node and the second mobile node according to the first status information and the second status information, it means that there is no risk of collision between the first mobile node and the second mobile node and, consequently, the data relay mobile apparatus doesn't need to relay data. Afterwards, step 402 is executed to enable the receiving module to continuously receive the first status information and the second status information from the first mobile node and the second mobile node respectively.

Accordingly, via the data relay mobile apparatus, the data relay method, and the computer program product thereof of certain embodiments of the present invention, a node status list is used to record status information of adjacent mobile nodes and, according to the status information of the mobile nodes, whether data relay is needed is determined so that each mobile node in the wireless network can receive status information of its adjacent mobile nodes. Accordingly, by use of the data relay mobile apparatus, the data relay method and the computer program product thereof of the present invention, data relay for a mobile node that is moving in a wireless network can be accomplished by means of identical mobile nodes, thereby solving the problem of shadow fading effect more effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data relay method for used in a data relay mobile apparatus for a wireless network, the wireless network comprising a first mobile node and a second mobile node, the data relay method comprising the following steps of:
   (A) providing, by the data relay mobile apparatus, a node status list;
   (B) receiving, by the data relay mobile apparatus, first status information of the first mobile node and second status information of the second mobile node, wherein the first status information comprises first mobile node movement data and the second status information comprises second mobile node movement data;

(C) updating, by the data relay mobile apparatus, the node status list with the first status information and the second status information;

(D) determining, by the data relay mobile apparatus, that a correspondence status exists between the first mobile node and the second mobile node according to the first mobile node movement data of the first status information and the second mobile node movement data of the second status information;

(E) determining, by the data relay mobile apparatus, that the second mobile node is not a target node of the first mobile node according to the first status information; and (F) relaying, by the data relay mobile apparatus, the second status information to the first mobile node according to the correspondence status and the determination result of the step (E).

2. The data relay method as claimed in claim 1, wherein the step (F) further comprises the following step of:

(F1) setting, by the data relay mobile apparatus, a time period;

wherein the second status information is transmitted to the first mobile node at an end of the time period.

3. The data relay method as claimed in claim 1, wherein the step (E) further comprises the following step of:

(E1) determining, by the data relay mobile apparatus, that the first status information doesn't comprise an identification (ID) number of the second mobile node;

wherein the second mobile node is determined not a target node of the first mobile node according to the determination result of the step (E1).

4. A computer program product, comprising a non-transitory tangible machine-readable medium having executable codes encoded thereon to cause a data relay mobile apparatus to perform a data relay method for a wireless network, the wireless network comprising a first mobile node and a second mobile node, the executable codes comprising:

a code A for enabling a storage module of the data relay mobile apparatus to provide a node status list;

a code B for enabling a receiving module of the data relay mobile apparatus to receive first status information of the first mobile node and second status information of the second mobile node, wherein the first status information comprises first mobile node movement data and the second status information comprises second mobile node movement data;

a code C for enabling a processing module of the data relay mobile apparatus to update the node status list with the first status information and the second status information;

a code D for enabling the processing module of the data relay mobile apparatus to determine that a correspondence status exists between the first mobile node and the second mobile node according to the first mobile node movement data of the first status information and the second mobile node movement data of the second status information;

a code E for enabling the processing module of the data relay mobile apparatus to determine that the second mobile node is not a target node of the first mobile node according to the first status information; and a code F for enabling a transmitting module of the data relay mobile apparatus to relay the second status information to the first mobile node according to the correspondence status and the determination result of the code E.

5. The computer program product as claimed in claim 4, wherein the code F further comprises:

a code F1 for enabling a timing module of the data relay mobile apparatus to set a time period;

wherein the second status information is transmitted to the first mobile node at an end of the time period.

6. The computer program product as claimed in claim 4, wherein the code E further comprises:

a code E1 for enabling the processing module of the data relay mobile apparatus to determine that the first status information doesn't comprise an ID number code of the second mobile node;

wherein the second mobile node is determined not a target node of the first mobile node according to the determination result of the code E1.

7. A data relay mobile apparatus for a wireless network, the wireless network comprising a first mobile node and a second mobile node, the data relay mobile apparatus comprising:

a storage module being configured to store a node status list;

a receiving module being configured to receive first status information of the first mobile node and second status information of the second mobile node, wherein the first status information comprises first mobile node movement data and the second status information comprises second mobile node movement data;

a processing module being configured to update the node status list with the first status information and the second status information, to determine that a correspondence status exists between the first mobile node and the second mobile node according to the first mobile node movement data of the first status information and the second mobile node movement data of the second status information, and to determine that the second mobile node is not a target node of the first mobile node according to the first status information; and a transmitting module being configured to relay the second status information to the first mobile node according to the correspondence status and the determination result of the processing module.

8. The data relay mobile apparatus as claimed in claim 7, further comprising:

a timing module being configured to set a time period;

wherein the transmitting module transmits the second status information to the first mobile node at an end of the time period.

9. The data relay mobile apparatus as claimed in claim 7, wherein the processing module is further configured to determine whether the first status information comprises an ID number of the second mobile node, and the second mobile node is determined not a target node of the first mobile node when the first status information doesn't comprise an ID number of the second mobile node.

* * * * *